(12) United States Patent
Iraschko

(10) Patent No.: US 8,733,516 B2
(45) Date of Patent: May 27, 2014

(54) BRAKE CYLINDER FOR A PNEUMATICALLY OPERABLE VEHICLE BRAKE

(75) Inventor: Johann Iraschko, Schweitenkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 805 days.

(21) Appl. No.: 12/566,991

(22) Filed: Sep. 25, 2009

(65) Prior Publication Data

US 2010/0078272 A1    Apr. 1, 2010

Related U.S. Application Data

(63) Continuation of application No. PCT/EP2008/002366, filed on Mar. 26, 2008.

(30) Foreign Application Priority Data

Mar. 27, 2007  (DE) .......................... 10 2007 015 206

(51) Int. Cl.
*B60T 17/00*    (2006.01)
(52) U.S. Cl.
USPC .............................................. 188/170; 92/63
(58) Field of Classification Search
CPC ..... B60T 17/16; B60T 17/083; B60T 17/085; B60T 17/086
USPC ....... 92/63, 64, 78, 130 A; 188/106 F, 153 D, 188/170, 152
See application file for complete search history.

(56) References Cited

U.S. PATENT DOCUMENTS 2,792,686 A * 5/1957 Ingres .............................. 60/553
2,812,639 A * 11/1957 Whitten .......................... 60/553

(Continued)

FOREIGN PATENT DOCUMENTS

DE        199 33 165 A1    1/2001
DE        10 2005 044 708 A1    4/2006
WO     WO 2006032446 A1 *    3/2006    .............. B60T 17/08

OTHER PUBLICATIONS

German Office Action dated Jan. 8, 2008 including English translation (Eight (8) pages).

(Continued)

*Primary Examiner* — Bradley King
*Assistant Examiner* — Stephen Bowes
(74) *Attorney, Agent, or Firm* — Crowell & Moring LLP

(57) ABSTRACT

A brake cylinder for a pneumatic vehicle brake, particularly for a commercial vehicle includes a spring-loaded brake section for performing parking brake operations by a spring-loaded spring, and a service brake section for performing compressed air-actuated service brake operations. The spring-loaded brake section and the service brake section are combined in a structural unit in a housing. The housing is divided by a piston into a pressure chamber to which compressed air can be applied and a further space. The pressure chamber serves the actuation of the service brake section in the pressure space and the spring-loaded spring of the spring-loaded section being disposed in the additional space on the opposite side of the piston. The spring-loaded spring acts on an additional spring-loaded piston in the space. The piston is lockable in relation to the piston by a pneumatically operable locking mechanism and releasable from the same by releasing the locking mechanism. The piston is further connected to a piston rod, either directly or indirectly or by additional elements, for actuating the vehicle brake. The brake cylinder is configured such that the compressed air supply to the locking mechanism occurs via a compressed air hose.

11 Claims, 1 Drawing Sheet

(56) References Cited

U.S. PATENT DOCUMENTS

| | | | | |
|---|---|---|---|---|
| 2,847,828 | A | * | 8/1958 | Porter .............................. 60/559 |
| 2,936,785 | A | * | 5/1960 | Hastings ........................... 92/49 |
| 3,020,094 | A | | 2/1962 | Murty at al. |
| 3,479,927 | A | * | 11/1969 | Woodward ...................... 92/128 |
| 3,498,188 | A | * | 3/1970 | Rodriguez ........................ 92/29 |
| 3,636,822 | A | | 1/1972 | Horowitz |
| 3,717,072 | A | * | 2/1973 | Kaltenthaler et al. .......... 92/152 |
| 3,759,147 | A | | 9/1973 | Johnsson et al. |
| 7,523,999 | B2 | | 4/2009 | Iraschko |

OTHER PUBLICATIONS

International Search Report dated Jul. 22, 2008 including English translation (Four (4) pages).

* cited by examiner

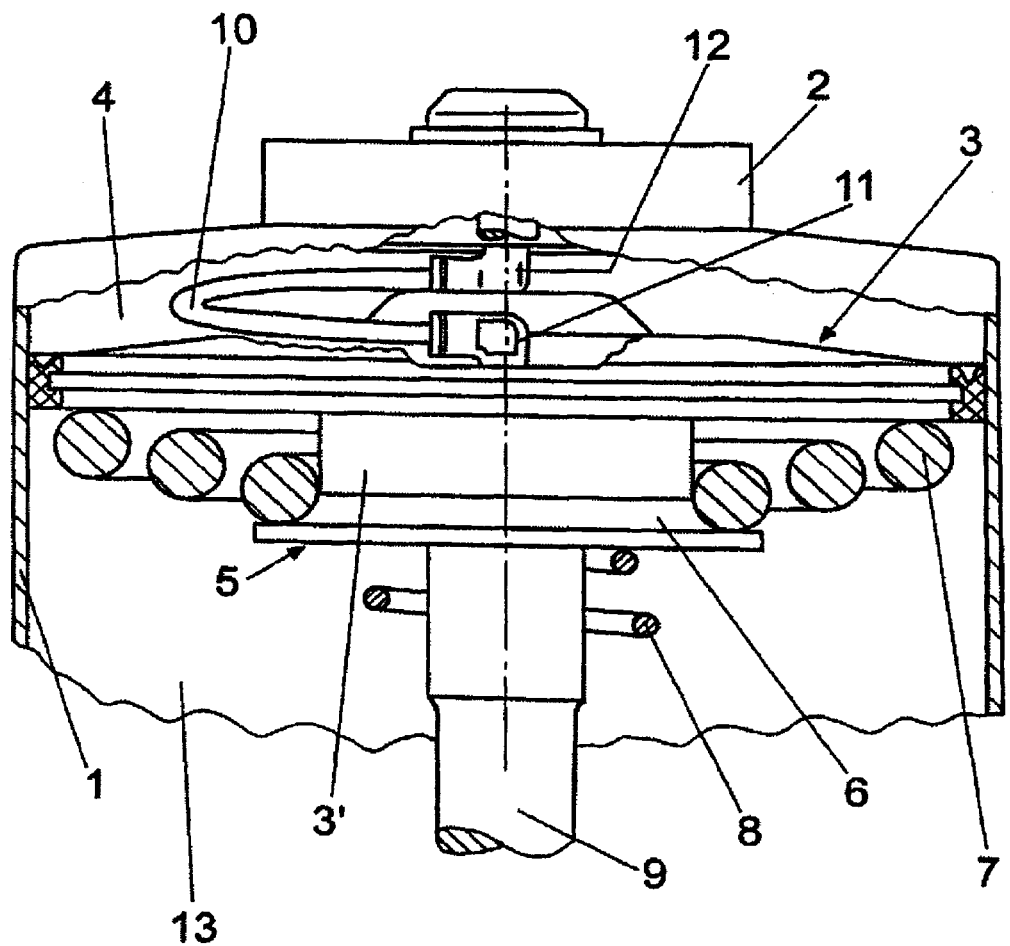

BRAKE CYLINDER FOR A PNEUMATICALLY OPERABLE VEHICLE BRAKE

CROSS-REFERENCE TO RELATED APPLICATIONS

This application is a continuation of PCT International Application No. PCT/EP2008/002366, filed Mar. 26, 2008, which claims priority under 35 U.S.C. §119 to German Patent Application No. DE 10 2007 015 206.1, filed Mar. 27, 2007, the entire disclosures of which are herein expressly incorporated by reference.

This application contains subject matter related to U.S. application Ser. No. 13/761,522, entitled "Compact Combined Cylinder Comprising a Manual Release Device;" U.S. application Ser. No. 12/567,098, entitled "Compact Combination Cylinder for Vehicle Brakes, Comprising a Control Device, and Method for Controlling the Brake Cylinder;" U.S. application Ser. No. 12/567,080, entitled "Compact Combined Cylinder Comprising a Manual Release Device;" U.S. application Ser. No. 12/567,043, entitled "Compact Combination Brake Cylinder Comprising a Pneumatic Locking Mechanism" and U.S. application Ser. No. 12/567,085, entitled "Compact Combined Brake Cylinder," all filed on even date herewith.

BACKGROUND AND SUMMARY OF THE INVENTION

The invention relates to a brake cylinder for pneumatically actuated vehicle brakes, in particular for commercial vehicles.

In heavy commercial vehicles, the parking brake is actuated by what are known as spring force accumulator cylinders (spring-loaded cylinders). Here, the brake actuating force is generated via a spring force, with the result that the requirements for a mechanically actuated parking brake are satisfied.

Since the spring force accumulator cylinders are, as a rule, designed to generate very high forces, manual release of the parking brake in the operating case is not appropriate. In the case of pneumatically actuated brakes, the release therefore takes place by means of compressed air.

In order to make this possible, spring force accumulator cylinders are, as a rule, equipped with a release piston. It is possible by way of this piston, if compressed air is introduced, to compress the spring to such an extent that the brake is released. In order that the parking brake is not engaged while driving, the piston is loaded constantly with compressed air, with the result that the spring cannot be relieved and therefore the parking brake does not start to act.

A common design is what is known as a combined cylinder. This cylinder includes or combines two different brake cylinder types, namely a spring force accumulator cylinder for the parking brake system (PBS) and a compressed air cylinder (usually a diaphragm cylinder) for the service brake system (SBS).

The two cylinders are usually arranged behind one another in an axial direction. The spring force accumulator part, which acts with its piston rod on the piston collar of the diaphragm cylinder and by the latter, in turn, on the brake lever, is arranged behind the diaphragm part of the combined cylinder.

This design requires a relatively large amount of installation space. However, the installation space is being limited increasingly by the introduction of more complex chassis systems, such as independent suspension systems, lightweight axles, etc.

There are therefore efforts to minimize the space requirement for the parking brake cylinder by other designs and methods of operation. To this extent, what is known as a compact combined cylinder affords a compact design. DE 10 2005 044 708 A1 (corresponding to U.S. Pat. No. 7,523,999 B2) discloses a brake cylinder of this type. In DE '708, the function of the parking brake cylinder is integrated directly into the service brake cylinder. Here, the spring force accumulator spring is no longer actuated via a separate spring force accumulator piston, but rather likewise via the piston of the service brake cylinder. In order to release the parking brake, the SBS piston is loaded for a short time period by way of a special actuation with compressed air. As described, the parking brake is released as a rule with the aid of compressed air.

In the compact combined cylinder which is known from the above-mentioned DE 10 2005 044 708 A1, the pressure supply of the locking mechanism takes place by way of a centrally arranged, stationary supply tube which is guided through the axially movable piston. Since the spaces which are formed by the piston have to be closed in an airtight manner with respect to one another, the piston is correspondingly sealed with respect to the supply tube by use of a sliding seal. However, this sliding seal is subjected to very pronounced wear, since a large sliding travel in comparison with the seal of relatively low dimensions has to be covered during every brake actuation.

Naturally, this represents an extremely unsatisfactory solution, which not only leads to an impairment of the functional reliability of the parking brake, but is also associated with considerable costs, in particular as a result of repair work.

The invention is based on the object of developing a brake cylinder of the generic type in such a way that an improvement in the functional reliability and a longer service life are achieved with structurally low complexity.

This object is achieved by a brake cylinder for a pneumatically actuable vehicle brake, in particular for a commercial vehicle, including a spring force accumulator brake section for carrying out parking brake operations by way of a spring force accumulator spring, and a service brake section for carrying out service brake operations, which are actuated by compressed air. The spring force accumulator brake section and the service brake section are combined in a housing to form one structural unit. The housing is divided by a piston into a pressure space loadable with compressed air and a further space. The pressure space serves for actuating the service brake section, and the spring force accumulator spring of the spring force accumulator section is arranged in the further space on the opposite side of the piston. The spring force accumulator spring acts in the space on a further spring force accumulator piston, which can be locked with respect to the piston by a pneumatically actuable locking mechanism and can be released by release of the locking mechanism. The accumulator piston is connected directly or via further elements to a piston rod for actuating the vehicle brake. Compressed air is fed to the locking mechanism via a compressed air hose.

The use of a sliding seal can be dispensed with as a result of this structural refinement of the brake cylinder. This results in a significant increase in the service life of the brake cylinder, since the feed region of the compressed air to the locking mechanism no longer has to be sealed to the previously required extent. In principle, one sealing ring is sufficient to seal the line, which is guided through the piston but is rigidly connected to the piston. The functional capability of the brake cylinder, in relation to this pass-through region, therefore remains independent of the number of brake actuations.

There is provision according to one advantageous embodiment of the invention to guide the hose connections laterally, preferably tangentially, both on the cylinder housing and on a cover which is connected to it and on the piston. As a result, the movement of the piston can take place without impairment. A further contribution is made to this by the fact that the compressed air hose is laid approximately annularly, in the nonfunctional position of the piston in a pressure space which is formed. The hose connections are preferably configured as angled parts.

Further advantageous embodiments of the invention are described herein.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE shows a part detail of a brake cylinder according to an embodiment of the invention in a partially sectioned side view.

DETAILED DESCRIPTION OF THE DRAWING

The brake cylinder, which is shown in the FIGURE, has a cup-shaped, preferably substantially cylindrical housing 1. The housing 1 is closed at one of its ends by a cover 2, through which a hose connection 12 is guided. A piston 3, the diameter of which corresponds to the internal diameter of the housing 1, is arranged in the housing 1.

Together with the cover 2 which closes the housing 1, the piston 3 delimits a pressure space 4, into which compressed air can be guided via a compressed air connection (not shown) in the cover 2 in order to actuate the piston 3.

Secondly, the piston 3 delimits a space 13, in which a restoring spring 8 and a spring force accumulator spring 7 are inserted. The spring force accumulator spring 7 is arranged between the piston 3 and a spring force accumulator piston 6, the diameter of which is smaller than the inside diameter of the housing 1. The restoring spring 8 is arranged between the side of the spring force accumulator piston 6 which faces away from the spring force accumulator spring 7 and the inner end region of the housing 1 which faces away from the cover 2.

A pneumatically actuable locking mechanism 5 is accommodated in an angular receiving space 3' of the piston 3. The method of operation of an exemplary locking mechanism is known from DE 10 2005 044 708 A1 (corresponding to U.S. Pat. No. 7,523,999 B2), such that a detailed description is not necessary.

The locking mechanism is pneumatically actuable. To this end, it is connected via a compressed air hose 10 to a compressed air supply, which is common for the piston 3, to be precise via the hose connection 12 and a hose connection 11, which is connected directly to the locking mechanism. The hose connections 11, 12 are fastened in each case to one end of the compressed air hose 10.

As can be seen clearly, the compressed air hose 10 is guided annularly in the pressure space 4, in order thus for it to be possible to accommodate the hose length necessary for the required stroke, without impairment of the movement of the piston 3. The hose connections 11, 12 are configured in such a way that the compressed air hose 10 is inserted laterally, which results in a very low overall height of the hose connections 11, 12, which likewise ensure that the functional capability of the piston 3 remains unimpeded. If required, the compressed air hose can also be configured as a spiral hose.

| Table of Reference Numerals | |
|---|---|
| 1 | Housing |
| 2 | Cover |
| 3 | Piston |
| 3' | Receiving space |
| 4 | Pressure space |
| 5 | Locking mechanism |
| 6 | Spring force accumulator piston |
| 7 | Spring force accumulator spring |
| 8 | Restoring spring |
| 9 | Piston rod |
| 10 | Compressed air hose |
| 11 | Hose connection |
| 12 | Hose connection |
| 13 | Space |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake cylinder for a pneumatically actuated vehicle brake, comprising:
   a spring force accumulator brake section for carrying out parking brake operations via a spring force accumulator spring, and a service brake section for carrying out service brake operations which are actuated by compressed air, the spring force accumulator brake section and the service brake section being combined in a housing to form one structural unit;
   a first piston dividing the housing into two spaces, of which one of the two spaces serves as a pressure space for actuating the service brake section, the spring force accumulator spring of the spring force accumulator section being arranged in the other space on an opposite side of the piston;
   a pneumatically actuable locking mechanism, the spring force accumulator spring acting in the space on a further spring force accumulator piston which is lockable with respect to the first piston by the locking mechanism, and is first releasable by a release action of the locking mechanism, the spring force accumulator piston being connected directly or via further elements to a piston rod for actuating the vehicle brake; and
   a compressed air hose through which compressed air is fed to the pneumatically actuable locking mechanism,
   wherein the compressed air hose is arranged in the pressure space.

2. The brake cylinder as claimed in claim 1, wherein the compressed air hose is arranged annularly in the pressure space.

3. The brake cylinder as claimed in claim 2, wherein the compressed air hose is operatively configured as a spiral hose.

4. The brake cylinder as claimed in claim 2, wherein the compressed air hose is guided laterally into a connection to the locking mechanism.

5. The brake cylinder as claimed in claim 2, wherein the compressed air hose is guided laterally into a housing-side compressed air supply connection.

6. The brake cylinder as claimed in claim 2, wherein the compressed air hose is connected to hose connections which are configured as angled parts.

7. The brake cylinder as claimed in claim 1, wherein the compressed air hose or an associated hose connection is guided through the piston.

8. The brake cylinder as claimed in claim 7, wherein the compressed air hose is guided laterally into a connection to the locking mechanism.

9. The brake cylinder as claimed in claim 1, wherein the compressed air hose is guided laterally into a connection to the locking mechanism.

10. The brake cylinder as claimed in claim 1, wherein the compressed air hose is guided laterally into a housing-side compressed air supply connection.

11. The brake cylinder as claimed in claim 1, wherein the compressed air hose is connected to hose connections which are configured as angled parts.

\* \* \* \* \*